United States Patent Office 3,015,154
Patented Jan. 2, 1962

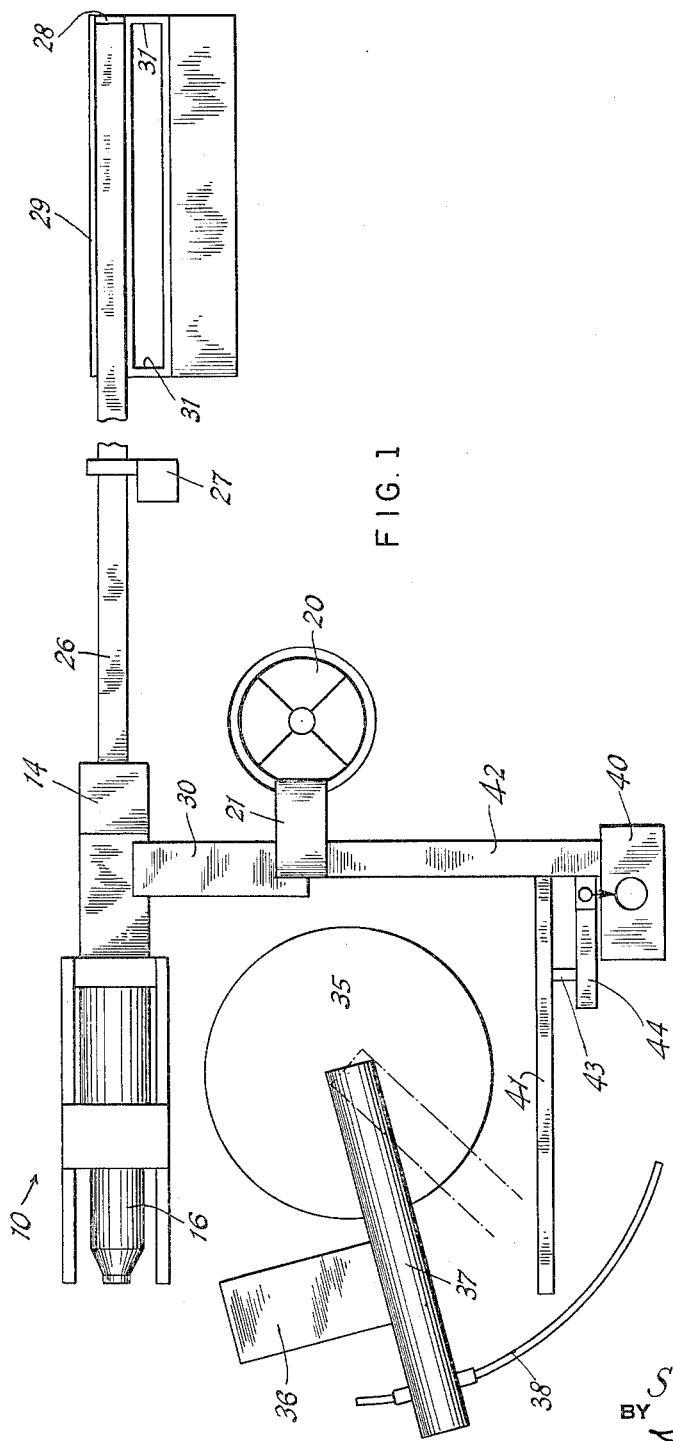

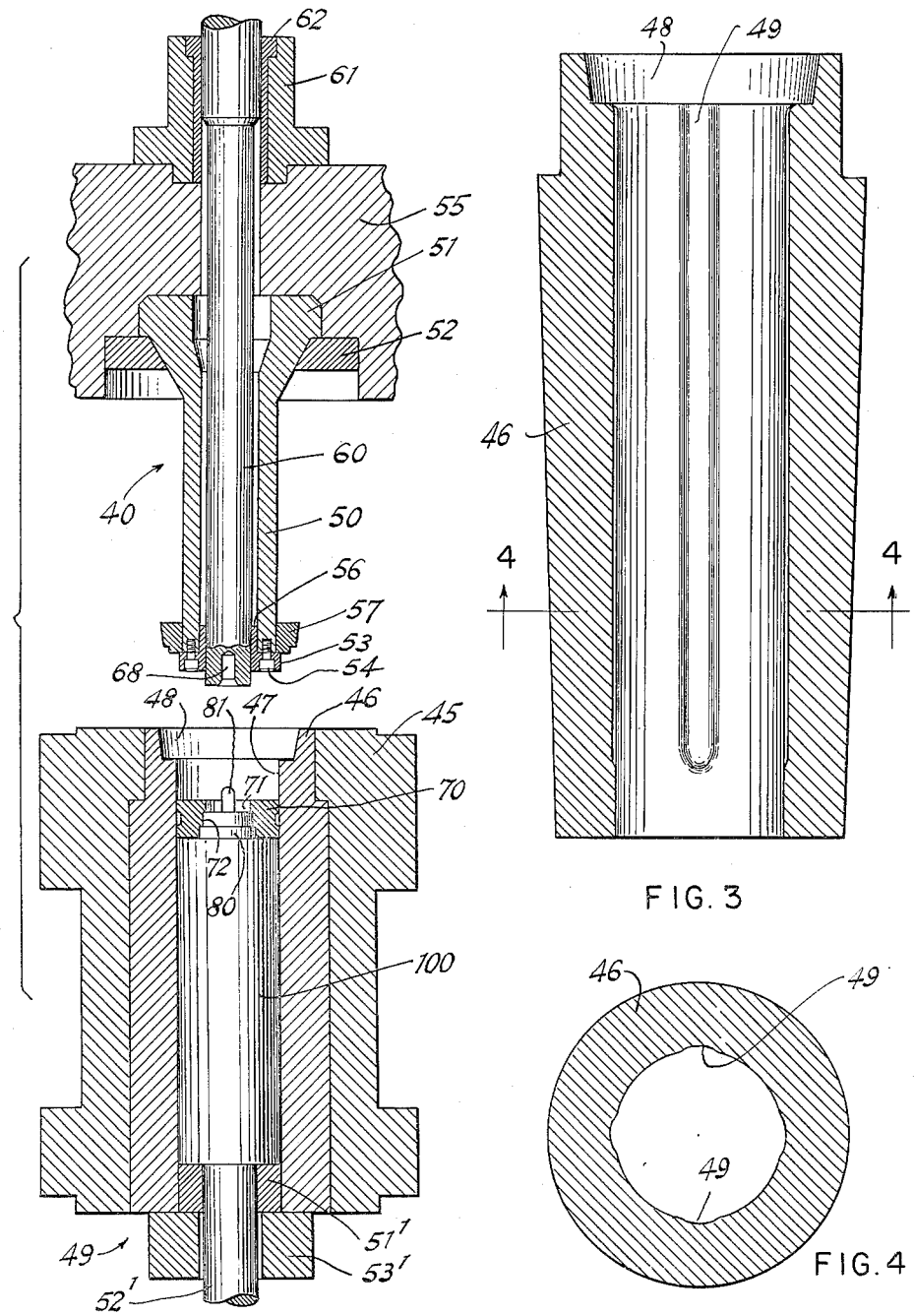

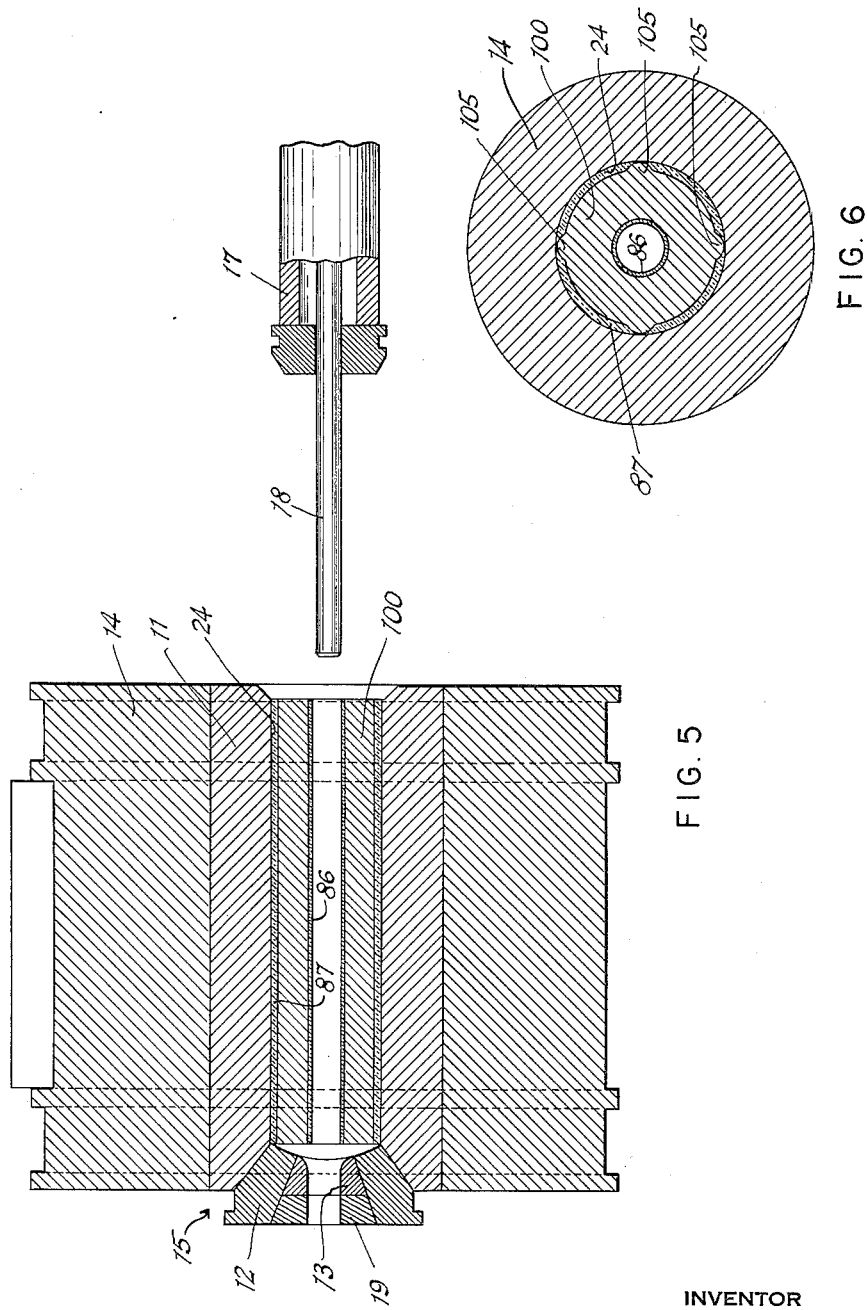

3,015,154
RIBBED EXTRUSION BILLET
Sidley O. Evans, Beaver Falls, Pa., assignor to The Babcock & Wilcox Company, New York, N.Y., a corporation of New Jersey
Filed Mar. 15, 1954, Ser. No. 416,310
2 Claims. (Cl. 29—183)

This invention relates to billets for use in extrusion presses and, more particularly, to a ribbed extrusion billet and apparatus for forming the same.

In the formation of metal shapes by extrusion, a block or billet of metal at an elevated temperature is forced under high pressure to flow through a die having an opening corresponding to the desired cross-sectional shape of the extrusion to be produced. The temperature of the metal may be 2300° F., in the case of steel, by way of example.

To form a tubular extrusion, the billet is usually pierced before insertion in the extrusion press and, before ram pressure is applied to the billet, a mandrel is projected coaxially through the billet and die. When pressure is applied to the billet, the billet metal flows through the die around the mandrel, so that a tube is extruded having dimensions determined by the die and the mandrel. In effect, the die and mandrel cooperate to form an annular die.

In a typical extrusion press, a front and rear platen are held in accurately spaced relation with each other. Between the platens is mounted a billet container for movement toward and away from the forward platen. The rear platen supports a ram arranged to project into the container and force a billet therein to flow through the die. The latter is mounted in a die holder releasably engaged in a die carrier aligned with the container passage. This carrier is mounted for movement into and out of the forward platen to move the die into and out of operative relation with the exit or downstream end of the container.

When an extrusion is to be made, the container is moved forwardly to seat against the rear face of the forward platen. A die holder and die assembly is meanwhile mounted on the rear face of the carrier and the latter is moved rearwardly into the forward platen to engage the die in a recess in the forward end of the container and coaxial with the container passage. The carrier is then locked to the forward platen. After a heated billet has been loaded into the container, the ram, carrying a dummy block on its outer end, is moved forwardly under very high pressure to force the billet outwardly through the die. The extrusion is then severed and conveyed away from the press.

The mandrel used in forming tubular extrusions is mounted coaxially in the ram and may be selectively projected from the ram or retracted thereinto. The relative projected length of the mandrel is such that it is projected through the die before the ram exerts extruding pressure on the rear end of the billet.

The formation of metal shapes by extrusion has been successfully applied to non-ferrous metals for some time. However, it is only recently that plain and alloy steels have been extruded using glass as a lubricant. This has been due to the relative difficulties and problems involved in the extrusion of steels and alloys as compared to the difficulties and problems of extruding non-ferrous metals such as aluminum, brass, and copper. For example, the use of lubricants having a carbon base for the extrusion of some alloy steels may require an excessive amount of refinishing of the extruded shape due to the carbon pickup in the hot metal. These extra finishing operations have prevented the extrusion process from attaining a competitive position with respect to other metal working processes.

This picture has been changed radically by the introduction of a new steel extrusion process in which relatively refractory materials, such as glass, have been used as lubricants. These refractory materials have the advantage that they do not contain any significant amounts of carbon as a constituent element, coupled with a further advantage that the glass has the property of melting in successive layers or films as it is contacted by the hot metal. Thus, only the surface or contacting layer of the glass is initially melted as the billet moves therealong, and as this film is destroyed, successive underlying layers or films are melted sequentially, thus providing a continuous lubricant film between the extrusion and the die through which the extrusion is being forced under very high pressures.

To provide the necessary clearance for a layer of glass lubricant between the container passage and the outer surface of the billet therein, the billet necessarily has an outside diameter somewhat smaller than the diameter of the container passage. This introduces a problem in maintaining the billet concentric of the passage during the extrusion operation. The weight of the billet, particularly with steel billets, is very substantial even in the shorter lengths. For practical reasons, the container passage is disposed horizontally. Hence there is a tendency for the weight of the billet to compress the lubricant film on the underside of the billet so that, even though a uniformly thick film of lubricant is initially present, the film will be thinner on the underside of the billet than on its upper side. Thus, the billet shifts radially of the container passage and becomes eccentric thereto. This problem is particularly important in the formation of tubular extrusions. The radial shifting of the tubular billet in the container passage results in the inner and outer surfaces of the resultant tubular extrusion being eccentric to each other, with resultant non-uniformity of wall thickness.

In accordance with the present invention, these disadvantages are overcome and concentricity is substantially improved by forming the billet with circumferentially spaced ribs extending longitudinally of its outer surface, the diameter of the ribs being substantially equal to the diameter of the container passage. Preferably, the ribs are substantially parallel to each other and have a curvilinear cross-section. When the billet is charged into the container, the ribs engage the surface of the container passage to support the billet concentrically with the latter. While some reduction in the total area of the glass lubricant film is effected by the use of these ribs, the amount of such reduction is very minor and adequate lubrication is still obtained.

The ribs on the billet are formed during the piercing operation. For this purpose, the billet receiving passage in the container of the piercing press, or the inner surface of a removable liner telescoped in such container passage, is formed with substantially parallel circumferentially spaced flutes extending longitudinally thereof. In the operation of the piercing press, a billet of smaller diameter than the billet receiving passage is charged into such passage and then a ram is forced axially against the outer end of the billet to pre-compress the billet expanding it radially into conforming engagement with the surface of the billet receiving passage. The flutes form ribs on the outer surface of the billet. After the pre-compression stroke of the piercing press ram, a mandrel telescoped through the ram is pierced axially through the pre-compressed billet to form the tubular billet, expanding the billet to fill the flutes.

For an understanding of the invention principles, reference is made to the following description of a typical embodiment thereof as illustrated in the accompanying drawings.

In the drawings:

FIG. 1 is a schematic plan view of a metal extrusion arrangement incorporating the invention;

FIG. 2 is an axial vertical sectional view of a portion of a piercing press incorporating the invention billet forming arrangement, showing the parts before the start of the pre-compression stroke;

FIG. 3 is an enlarged axial sectional view of the liner of the container of the press shown in FIG. 2;

FIG. 4 is a diametric sectional view of the liner on the line 4—4 of FIG. 3;

FIG. 5 is an axial sectional view through the container of the extrusion press, and an associated die, showing the invention billet mounted in the container; and FIG. 6 is a diametric sectional view through the container liner and the billet therein, rotated about 45° from the position of FIG. 5.

Referring to FIGS. 1, 5 and 6, an extrustion press 10 is illustrated as including a container 14, a die assembly 15 held against the front end of container 14, and a ram assembly 16 having a ram 17 and a mandrel 18 projectable into container 14. The billets to be extruded are heated to a high temperature, such as 2300 F. in the case of steel, in a suitable heating means 20. The billets are charged into a heating means 20 and extracted therefrom by a suitable billet handling device 21. This device deposits the heated billets onto a transfer means 30, which carries the billets into alignment with passage 24 of container 14 and ejects them into this passage.

Mandrel 18 is then moved into passage 24 to extend through a die in assembly 15. Ram 17 is then projected into passage 24 to engage the billet and force it, under high pressure, between the die and mandrel 18. When the extrusion is completed, mandrel 18 is retracted into ram 17. The ram is then withdrawn and container 14 moved rearwardly a short distance away. The extrusion is then severed at the front end of the container, after which container 14 is moved forwardly and the extrusion withdrawn by runout table and conveyor 26. Ram 17 is then moved into container 14 to eject the severed end, or discard, of the extrusion, this discard falling into a suitable receptacle.

Meanwhile, conveyor 26 moves the extrusion forwardly beneath a saw 27. The latter severs the extrusion into the required handling lengths and the cut sections are moved forwardly against a stop 28. At this point, a pusher 29 moves the sections laterally from conveyor 26 onto skids 31 for storage or further handling.

Before delivery of the heating means 20, the billets intended for tubular extrusions are preheated and pierced. The billets to be preheated are first placed on a loading platform or station 36. A billet loader 37 is arranged with furnace 35, being swingable through an arc about the center of furnace 35, the outer end of loader 37 running on an arcuate track 38. The loader is movable between the furnace charging position shown in full lines and a billet removing position shown in dotted lines. The furnace 35 rotates, at a very slow rate, in a clockwise direction as viewed in FIG. 1. The size and rate of intermittent rotation of furnace 35 are so selected that during the time the billets are moved from the solid line loading position to the dotted line unloading position they are heated uniformly to the desired preheating or piercing temperature.

As the billets, heated to the desired working temperature, are removed from furnace 35 by loader 37, they are placed on a conveyor 41. The billets which are to be extruded as tubing are moved by conveyor 41 to a cross-conveyor 43 which carries billets to a loading conveyor 44 for a vertically arranged billet piercing press 40. In the particular arrangement schematically illustrated, the piercing press 40 pierces an axial hole longitudinally of the billet and somewhat larger in size than the internal diameter of the tubing to be extruded. The pierced billets are delivered to a conveying means 42 which conveys the billets to handling device 21 for charging into heating means 20.

Referring to FIGS. 2, 3 and 4, a billet piercing press 40, of the billet precompression type, is illustrated as including a billet container 45 having a vertically disposed replaceable liner 46 therein formed with a substantially cylindrical billet receiving passage 47. The lower end of billet passage 47 is closed by suitable back-up means generally indicated at 49. This back-up means may include a ring 51' movably disposed within the lower end of passage 47 and acting as a guiding means for a back-up mandrel 52'. Ring 51' is supported on a member 53'.

In practice, container 45 is mounted for lateral movement into and out of operative relation with the press ram and mandrel for loading of a billet 100 thereinto and ejection of the pierced billet therefrom. When at the operative position, container 45 is axially aligned with a vertically movable ram 50 and a vertically movable piercing mandrel 60, the mandrel 60 being telescoped through ram 50 and having guiding engagement therein.

The ram 50 is a tubular member having an enlarged head 51 by means of which the ram is rigidly secured within the lower platen 55 of the press by means of a suitable clamping ring 52. This provides for ready interchangeability of rams to accommodate different diameter billets, the liner 46 of container 45 likewise being interchangeable for the same purpose. The lower end of ram 50 has a guiding collar 53 secured thereto by studs 54. This guiding collar has a tubular flange 56 projecting into ram 50 and acting as a guiding bushing for mandrel 60. The outer diameter of ring 53 is slightly greater than the outer diameter of ram 50 to serve as a retainer for a ram guiding ring 57 axially movable on ram 50. When ram 50 enters container passage 47, ring 57 has a conforming fit in an enlarged recess 48 so that it forms a lateral brace for the ram, at the upper end of liner 46, during operation of ram 50 in passage 47.

Suitable means, not shown, such as one or more hydraulic actuators, are provided to force platen 55, and thus ram 50, downwardly relative to container 45. The upper end of platen 55 has a tubular guide 61 mounted thereon in which is a bushing 62 engaging a mandrel holder which supports mandrel 60, thus providing a second guide for the mandrel spaced axially from the guiding ring 53 at the lower end of ram 50. Other actuating means, preferably hydraulic, are provided for effecting movement of mandrel 60 relative to ram 50 and platen 55 during the piercing operation. As these means form no part of the present invention, they have not been illustrated. The lower end of mandrel 60 is provided with a short axial recess or passage 68 for a purpose to be described.

As previously explained, the first stroke of the press during a cycle is a precompression stroke to expand billet 100 to fill liner 46. The billet has a smaller diameter than the liner for ease in charging the billet into the container. Prior to charging the container, a suitable lubricant is applied either to the billet or to the container to facilitate movement of the hot metal during the precompression and piercing strokes. This lubricant may, for example, be a vitreous material such as a glass.

During the precompression stroke, the mandrel and ram are forced downwardly as a unit to form a solid cylindrical member engaging the upper end of the billet, and the billet is compressed and radially expanded to fill the container passage. During the piercing stroke, the ram 50 rides upwardly on top of the billet, which expands upwardly due to upward flow of metal around the mandrel 60 during the piercing stroke.

For further guiding purposes, mandrel 60 may be provided with a collar 70 movable axially therealong and having an inner diameter, at its upper end 71, fitting the mandrel closely, and an outer diameter fitting passage 47 closely. Due to the relative inner and outer diameters of guiding ring 70, mandrel 60 is thus braced laterally from the wall of passage 47 throughout the piercing stroke, and at a zone at the upper end of billet 100. To retain this ring 70 on mandrel 60, the mandrel is provided with a removable piercing point 80 provided with a stepped circumferential periphery having a conforming fit in the correspondingly stepped inner surface 72 of ring 70. Piercing point 80 is further provided with a pin 81 projecting axially from its upper end and conformingly engageable in recess 68 in the lower end of mandrel 60.

After billet 100 is charged into container passage 47, ring 70 and piercing point 80, assembled as a unit, are positioned on top of the billet, preferably with the interposition of lubricant between the upper end of the billet and the unit. As ram 50 and mandrel 60 conjointly descend during the pre-compression stroke, pin 81 engages in recess 68 to center ring 70 and point 80 on the mandrel 60. The relative axial relation of parts is such that, as piercing point 80 has its upper surface engaged with the lower end of mandrel 60, the upper surface of ring 70 is engaged by the lower surface of ring 53 on ram 50, thus providing a flush lower surface for the press parts during the pre-compression stroke. As ram 50 and mandrel 60 enter the container passage, ram guiding ring 57 seats in recess 48. During downward movement of the ram and mandrel, ring 57 acts as a lateral brace for these parts during the precompression stroke which reduces the length of billet 100 and increases its diameter so that the billet is formly engaged with the wall of passage 47.

At the finish of the pre-compression stroke, mandrel guiding ring 70 remains on top of the compressed billet 100, having firm engagement with the outer surface of mandrel 60 and the surface of passage 17. As mandrel 60 is now forced downwardly through billet 100 to pierce the same, the displaced metal of the billet, flowing upwardly through passage 47 around mandrel 60 moves ring 70 upwardly, the ring always remaining engaged, by gravity, with the upper end of the metal of billet 100. Thus, during the piercing stroke, the mandrel 60 is always laterally braced at a zone adjacent the upper end of the billet 100.

In accordance with the present invention, circumferentially spaced, longitudinally extending ribs are formed on billet 100 during the pre-compression and piercing strokes of press 40. For this purpose, liner 46, as best seen in FIGS. 3 and 4, is provided with circumferentially spaced, longitudinally extending, flutes 49 which project radially outwardly from the inner surface of the liner. During the pre-compression stroke of press 40 billet 100 is compressed and the ends upset so that the ends conform to liner 46 and center the billet. Then as mandrel 60 is pierced through the billet, the displaced metal force the outer billet surface to conform to the liner contour so that ribs 105 are formed on the billet surface by flutes 49.

Referring to FIGS. 5 and 6, the invention billet is illustrated as mounted in container 14 of press 10 just prior to an extrusion operation. The passage 24 of container 14 is provided in a removable liner 11 for the container. The die assembly 15, which is clamped against the down stream end of liner 11 includes a supporting ring 12 in which is mounted a die 13 supported by a backing ring 19. In its passage from heating means 20 to press 10, billet 100 has layers of glass lubricant 86 and 87 applied to its inner and outer surfaces, respectively. The thickness of outer lubricant layer 87 is substantially equal to the height of the ribs 105, and may be a little greater than the height of the ribs.

When billet 100 is charged into passage 24, the ribs 105 engage the surface of the passage and the larger portion of the outer surface of the billet is spaced from the surface of passage 24. These ribs support and guide the billet in passage 24. The lubricant layer 87 on the outer surface of the billet between the ribs 105 provides sufficient lubricant for assuring easy movement of the billet along passage 24 during the extrusion operation. In this connection, it should be noted that the flutes 49, and consequently the ribs 105, have rounded outer surfaces. Thus, the lubricant layer 87 will cover the major portion of the surface of ribs 105 except for the actual line of contact of each rib with surface 24.

Due to the centering action provided by the ribs 105, better concentricity of extruded tubular products is obtained than with billets having an uninterrupted and somewhat cylindrical outer surface. As obtaining such concentricity is one of the problems in forming tubular extrusions, the invention improvement is thus very important to the quality of extruded tubular products.

While a specific embodiment of the invention has been shown and described in detail to illustrate the application of the invention principles, it will be understood that the invention may be embodied otherwise without departing from such principles.

What is claimed is:

1. An axially pre-compressed and pierced extrudable metal billet having a generally cylindrical cross-section with circumferentially spaced ribs extending longitudinally of its outer surface and of a height and cross-sectional area such that the total volume of the arcuate spaces between said ribs is substantially equal to the volume of lubricant required for continuous lubrication of the outer surface of the billet during the extrusion operation.

2. An axially pre-compressed and pierced extrudable metal billet having a generally cylindrical tubular cross-section with circumferentially spaced, parallel and rectilinear ribs extending longitudinally of its outer surface and of a height and cross-sectional area such that the total volume of the arcuate spaces between said ribs is substantially equal to the volume of lubricant required for continuous lubrication of the outer surface of the billet during the extrusion operation.

References Cited in the file of this patent

UNITED STATES PATENTS

| Number | Name | Date |
|---|---|---|
| 52,541 | Cushman | Feb. 13, 1866 |
| 1,049,641 | Astfalck | Jan. 7, 1913 |
| 1,587,933 | Barme | June 8, 1926 |
| 1,761,980 | Bundy | June 3, 1930 |
| 1,767,174 | Gathmann | June 24, 1930 |
| 1,810,041 | Gathmann | June 16, 1931 |
| 1,817,301 | Dunsheath | Aug. 4, 1931 |
| 2,005,175 | Adams | June 18, 1935 |
| 2,406,838 | Kepler | Sept. 3, 1946 |

FOREIGN PATENTS

| 121,354 | Australia | Apr. 12, 1946 |